United States Patent
Götz et al.

(10) Patent No.: US 11,251,735 B2
(45) Date of Patent: Feb. 15, 2022

(54) CONTROL DEVICE FOR AN INVERTER

(71) Applicant: Dr. Ing. h.c. F. Porsche Aktiengesellschaft, Stuttgart (DE)

(72) Inventors: Stefan Götz, Forstern (DE); Till Lütje, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/031,080

(22) Filed: Jul. 10, 2018

(65) Prior Publication Data

US 2019/0020298 A1    Jan. 17, 2019

(30) Foreign Application Priority Data

Jul. 11, 2017  (DE) .......................... 102017115506.6

(51) Int. Cl.
*H02P 27/08*  (2006.01)
*H02P 27/06*  (2006.01)
(Continued)

(52) U.S. Cl.
CPC .............. *H02P 27/06* (2013.01); *B60L 15/08* (2013.01); *B60L 53/11* (2019.02); *B60L 53/14* (2019.02);
(Continued)

(58) Field of Classification Search
CPC ........ H02P 27/06; H02P 29/032; H02P 25/16; H02P 25/22; B60L 53/22; B60L 53/11;
(Continued)

(56) References Cited

U.S. PATENT DOCUMENTS

| 7,932,633 B2 | 4/2011 | King et al. |
| 8,044,620 B2 * | 10/2011 | Sakai ........................ H02P 6/08 318/400.17 |

(Continued)

FOREIGN PATENT DOCUMENTS

DE   102012219385 A1   4/2014

OTHER PUBLICATIONS

Jung, "Power UP With 800-V Systems:; The Benefits of Upgrading Voltage Power for Battery-Electric Passenger Vehicles", IEEE Electrification Magazine, March 21017, pp. 53-58.

(Continued)

*Primary Examiner* — Kawing Chan
*Assistant Examiner* — Zemenay T Truneh
(74) *Attorney, Agent, or Firm* — RatnerPrestia

(57) ABSTRACT

A control device for an inverter has a first inverter terminal, a second inverter terminal and a plurality of bridge branches, which bridge branches each comprise a first semiconductor, a winding terminal and a second semiconductor switch. The winding terminals are connected to a winding arrangement. The control device is configured to output a control signal which enables a first bridge branch state and a second bridge branch state in the case of at least two of the bridge branches in a first operating state, wherein, in the first bridge branch state, the second semiconductor switch assigned to the bridge branch is switched on, and wherein, in the second bridge branch state, the second semiconductor switch assigned to the bridge branch is switched off. At least two of the bridge branches are occasionally simultaneously in the first bridge branch state, and a change of said at least two bridge branches into the second bridge branch state is subsequently carried out at different points in time.

16 Claims, 7 Drawing Sheets

Figure 1:
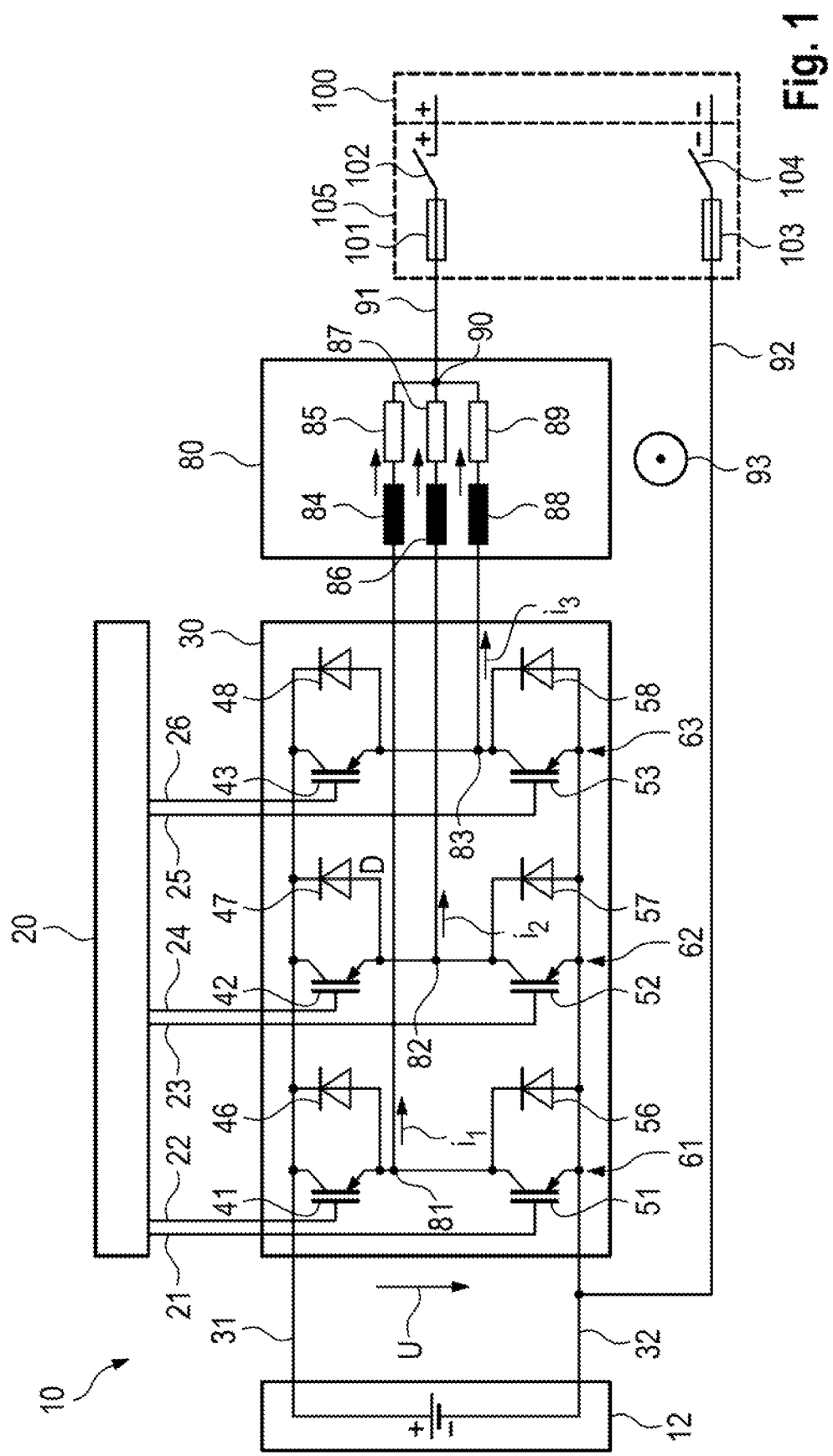

(51) Int. Cl.
*H02P 29/032* (2016.01)
*H02M 7/5387* (2007.01)
*H02P 25/16* (2006.01)
*B60L 53/10* (2019.01)
*B60L 53/14* (2019.01)
*B60L 53/24* (2019.01)
*B60L 15/08* (2006.01)
*B60L 53/22* (2019.01)
*H02J 7/00* (2006.01)
*H02P 25/22* (2006.01)
*H02M 3/158* (2006.01)
*H02P 23/22* (2016.01)
*H02P 6/08* (2016.01)

(52) U.S. Cl.
CPC .............. *B60L 53/22* (2019.02); *B60L 53/24* (2019.02); *H02J 7/00* (2013.01); *H02J 7/0045* (2013.01); *H02M 7/5387* (2013.01); *H02M 7/53871* (2013.01); *H02P 25/16* (2013.01); *H02P 25/22* (2013.01); *H02P 29/032* (2016.02); *B60L 2210/10* (2013.01); *B60L 2210/40* (2013.01); *B60L 2220/54* (2013.01); *B60L 2240/80* (2013.01); *B60L 2270/147* (2013.01); *H02J 2207/20* (2020.01); *H02M 3/1586* (2021.05); *H02P 6/08* (2013.01); *H02P 23/22* (2016.02); *H02P 2209/01* (2013.01)

(58) Field of Classification Search
CPC .......... B60L 53/14; B60L 53/24; B60L 15/08; H02J 7/0045; H02J 7/0052; H02M 7/5387; H02M 7/53871

USPC ........................................................ 318/139
See application file for complete search history.

(56) References Cited

U.S. PATENT DOCUMENTS

| | | | |
|---|---|---|---|
| 8,129,932 B2* | 3/2012 | Sakai | H02P 27/08 318/400.32 |
| 8,269,434 B2* | 9/2012 | Welchko | B60K 1/00 318/139 |
| 8,749,090 B2* | 6/2014 | Stancu | B60L 58/30 307/9.1 |
| 9,653,995 B2 | 5/2017 | Siehl et al. | |
| 2003/0210014 A1 | 11/2003 | Jabaji et al. | |
| 2005/0258796 A1* | 11/2005 | Kusaka | B60L 50/40 318/801 |
| 2011/0031922 A1* | 2/2011 | Sakai | H02P 23/22 318/519 |
| 2013/0154535 A1* | 6/2013 | Wai | H02P 29/0241 318/503 |
| 2015/0180356 A1 | 6/2015 | Norisada et al. | |

OTHER PUBLICATIONS

Chinese Office Action for Chinese Application No. 201810750916.7, dated Dec. 24, 2019, 6 pages.
Chinese Office Action for Chinese Application No. 201810750916.7, dated Jun. 12, 2020, with translation, 12 pages.

* cited by examiner

CONTROL DEVICE FOR AN INVERTER

CROSS-REFERENCE TO RELATED APPLICATION

This application claims priority to German Patent Application No. DE 10 2017 115 506.6, filed Jul. 11, 2017, which is incorporated by reference herein in its entirety.

FIELD OF THE INVENTION

The invention relates to a control device for an inverter.

BACKGROUND OF THE INVENTION

Inverters are used, for example, to condition a DC voltage and to feed it to a winding arrangement, such that the latter generates a magnetic field for driving a rotor, and the switches of the inverter are driven by a control device for this purpose.

US 2003/0210014 A1, which is incorporated by reference herein, discloses a battery charger in a vehicle system, which battery charger decouples the battery from the vehicle system if the voltage falls too low. The battery charger controls the charging rate of the battery and reconnects the battery to the vehicle system when the voltage lies above a predefined threshold.

US 2005/0258796 A1, which is incorporated by reference herein, discloses an inverter for driving a motor having a three-phase winding arrangement having a neutral point. An auxiliary voltage source and an auxiliary load are provided at the neutral point. Via the auxiliary voltage source and the auxiliary load, the state at the neutral point can be determined and an abnormality can be detected. The inverter can be influenced in a manner dependent thereon.

US 2015/0180356 A1, which is incorporated by reference herein, discloses are electrical converter having a bridge circuit having semiconductor switches.

SUMMARY OF THE INVENTION

It is an object of the invention to provide a novel control device.

This object is achieved by means of the subject matter of claim 1.

The change of the at least two bridge branches into the second bridge branch state at different points in time has the effect of reducing the voltage ripple and current ripple. The risk of electromagnetic interference is also reduced as a result. The use of a plurality of bridge branches additionally leads to a distribution of the power loss among the bridge branches and thus to more uniform heating.

In accordance with one preferred embodiment, the control device is configured to output in the first operating state at least occasionally a control signal which is provided, in the case of at least two bridge branches, to bring about a change back and forth between the first bridge branch state and the second bridge branch state in each case periodically. This enables the battery to be constantly charged.

In accordance with one preferred embodiment, the control device is configured to output in the first operating state at least occasionally a control signal which is provide, in the case of the at least two bridge branches, to carry out the change back and forth between the first bridge branch state and the second bridge branch state with the same period duration. This produces similar current magnitudes upon the individual changes and thus a uniform loading of the bridge branches.

In accordance with one preferred embodiment, the control device is configured to output in the first operating state at least occasionally a control signal which is provided to drive the at least two bridge branches with a phase shift. This enables the current fluctuations to be decreased, despite the same period duration.

In accordance with one preferred embodiment, the control device is configured to output in the first operating state at least occasionally a control signal which brings about a change in the phase shift between the individual bridge branches at predefined points in time. This breaks the phase relationship and hence the risk of mechanical influencing of the at least one rotor, in particular the generation of a longer-term torque and a rotational movement caused thereby.

In accordance with one preferred embodiment, the control device is configured to output in the first operating state at least occasionally a control signal which brings about the change in the phase shift by virtue of a period of the control signal being shortened in the case of at least one bridge branch. This leads to a change in the relative phase shift.

In accordance with one preferred embodiment, the control device is configured to output in the first operating state at least occasionally a control signal which brings about the change in the phase shift by virtue of a period, that is to say the period duration, of the control signal being lengthened in the case of at least one bridge branch. This leads to a change in the relative phase shift.

In accordance with one preferred embodiment, the control device is configured to output in the first operating state at least occasionally a control signal which is provided, in the case of the at least two bridge branches, to carry out the change back and forth between the first bridge branch state and the second bridge branch state with different period durations. A persistent rotating field in one direction is avoided as a result.

In accordance with one preferred embodiment, the control device is configured to output in the first operating state at least occasionally a control signal which is provided, in the case of at least three bridge branches, to bring about a change back and forth between the first bridge branch state and the second bridge branch state in each case periodically, wherein the at least three bridge branches are driven with a phase shift which generates a rotating field in a first predefined direction of rotation, and wherein, at a predefined point in time, the phase shift between the at least three bridge branches is changed in such a way that a rotating field is generated in a direction of rotation opposite to the first predefined direction of rotation. Such a phase failure prevents persistent driving of the rotor in a single predefined direction of rotation.

In accordance with one preferred embodiment, the control device is configured to output in the first operating state at least occasionally a control signal which is provided, in the case of at least four bridge branches, to bring about a change back and forth between the first bridge branch state and the second bridge branch state in each case periodically, wherein the at least four bridge branches are driven with a phase shift which does not generate a rotating field that rotates exclusively in one direction. Thus, the phase shift does not dispose in series windings which always bring about an advance of the rotating field in a single direction, rather the rotating field alternates partly in a first direction of rotation and partly in an opposite direction of rotation. A rotation of the rotor is avoided as a result.

In accordance with one preferred embodiment, the control device is configured to output in the first operating state at least occasionally a control signal which carries out the periodic switching back and forth in the respective bridge branch at a frequency of at least 5 kHz, more preferably at least 10 kHz, more preferably at least 50 kHz, more preferably at least 100 kHz, and particularly preferably at least 150 kHz. High frequencies reduce the risk of a torque being exerted on a rotor via the winding arrangement and said rotor being set in motion.

In accordance with one preferred embodiment, the control device is configured to drive the first semiconductor switches and the second semiconductor switches of the inverter in a second operating state in such a way that a rotating field suitable for driving a permanent-magnetic rotor is generated via the winding arrangement. This enables the control device to be used for the drive and for the charging.

In accordance with one preferred embodiment, an inverter is assigned to the control device, which inverter comprises a first inverter terminal, a second inverter terminal and a plurality of bridge branches, which bridge branches each comprise a first semiconductor switch, a winding terminal and a second semiconductor switch, which first semiconductor switch is provided between the first inverter terminal and the winding terminal, and which second semiconductor switch is provided between the winding terminal and the second inverter terminal, which winding terminals are connected to a winding arrangement. The control device can thus be used in a preferred manner.

In accordance with one preferred embodiment, the winding arrangement comprises a plurality of windings, which windings are connected to a common star point in a star connection, wherein each winding terminal is connected to the common star point via one of the windings of the winding arrangement. The use of a star connection is particularly advantageous for the charging.

In accordance with one preferred embodiment, a first charging terminal is electrically connected to the common star point, and a second charging terminal is electrically connected to the second inverter terminal, in order to enable a connection to a voltage source via the first charging terminal and the second charging terminal. This facilitates the connection of a voltage source for charging the battery.

In accordance with one preferred embodiment, a rechargeable battery is assigned to the control device, which rechargeable battery is electrically connected to the first inverter terminal and the second inverter terminal. This enables a discharging of the battery and a recharging of the battery by the inverter.

BRIEF DESCRIPTION OF THE INVENTION

Figure 2:
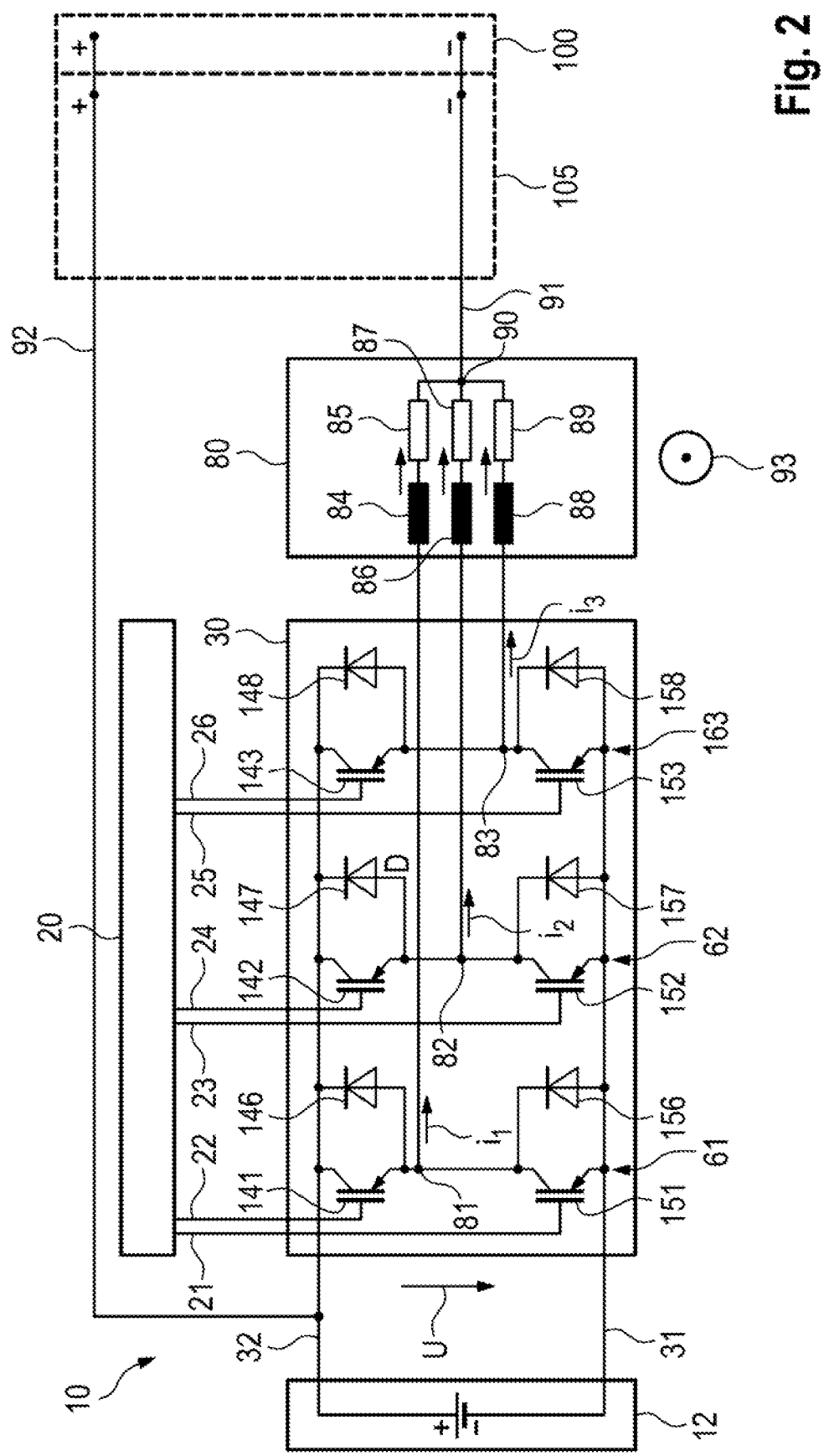
Figure 3:
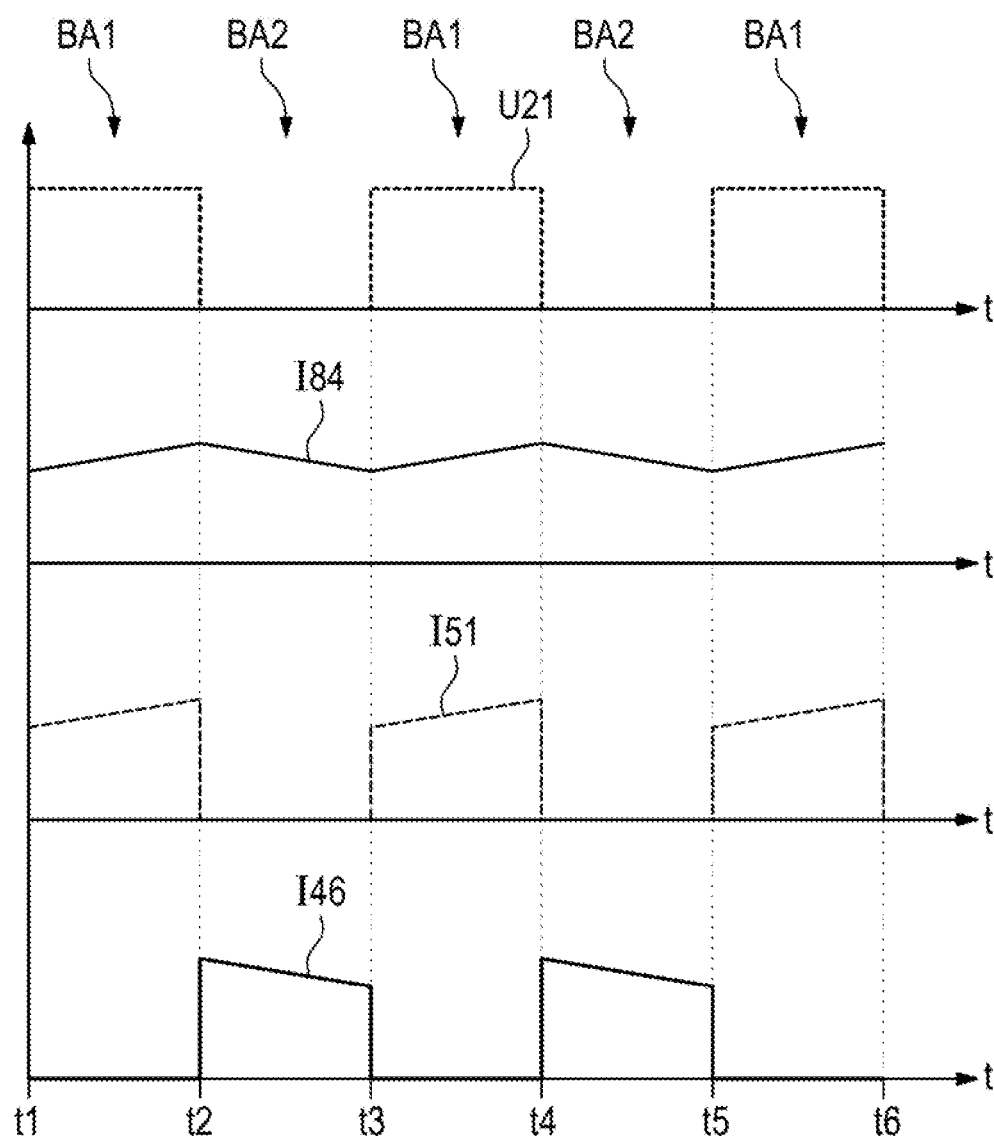
Figure 4:
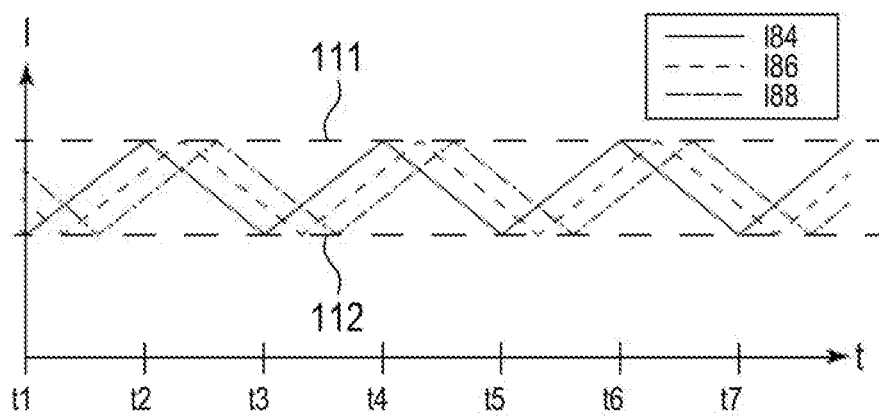
Figure 5:
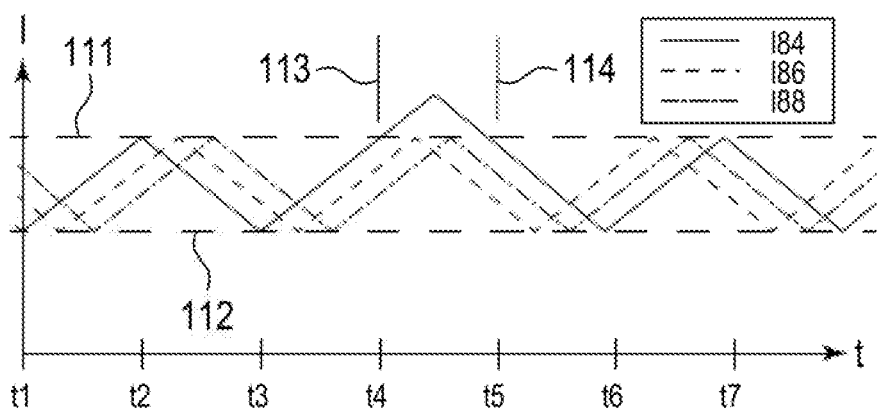
Figure 6:
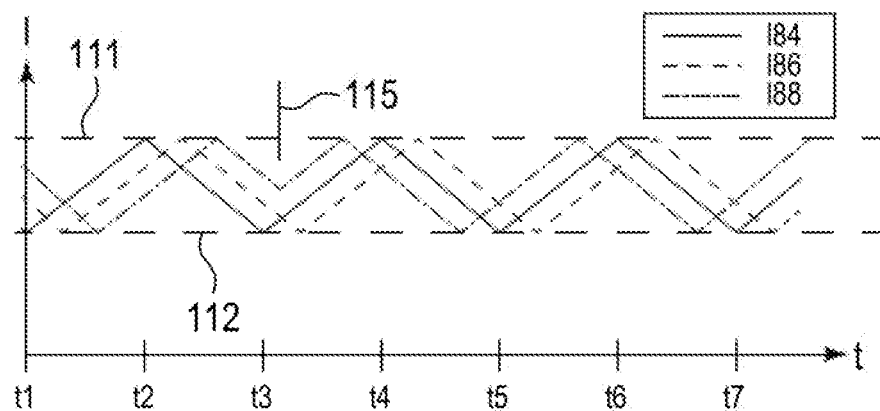
Figure 7:
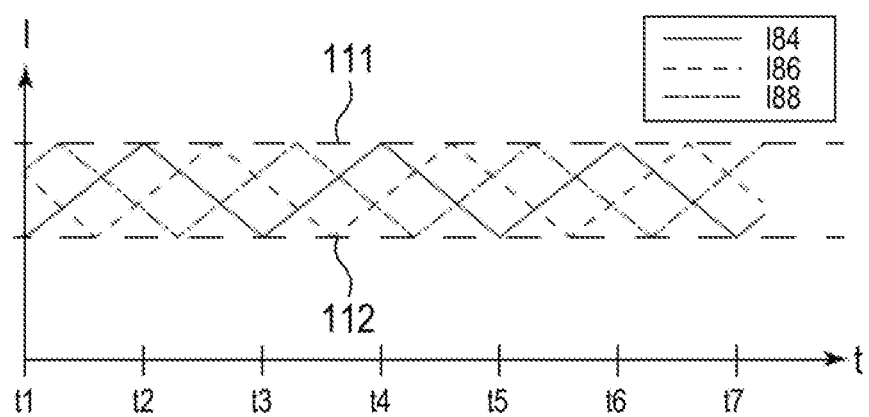
Figure 8:
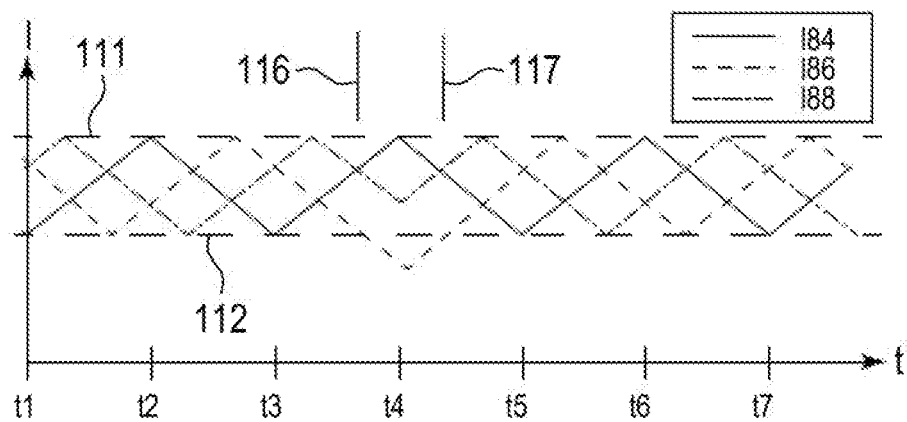
Figure 9:
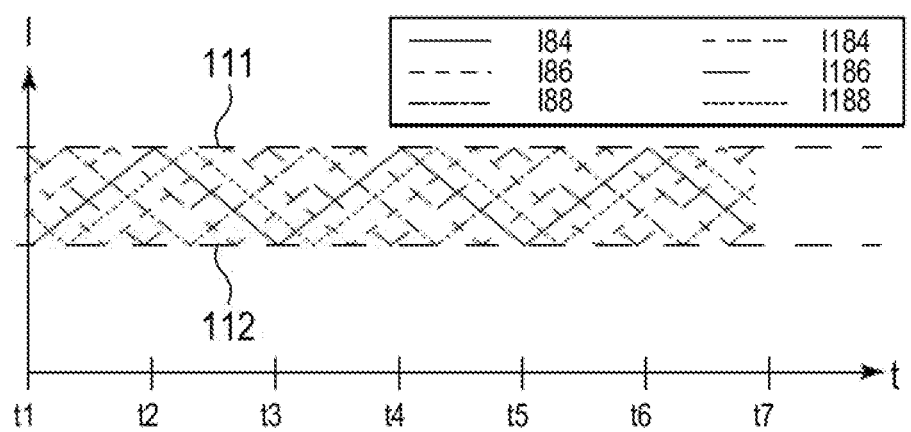
Figure 10:
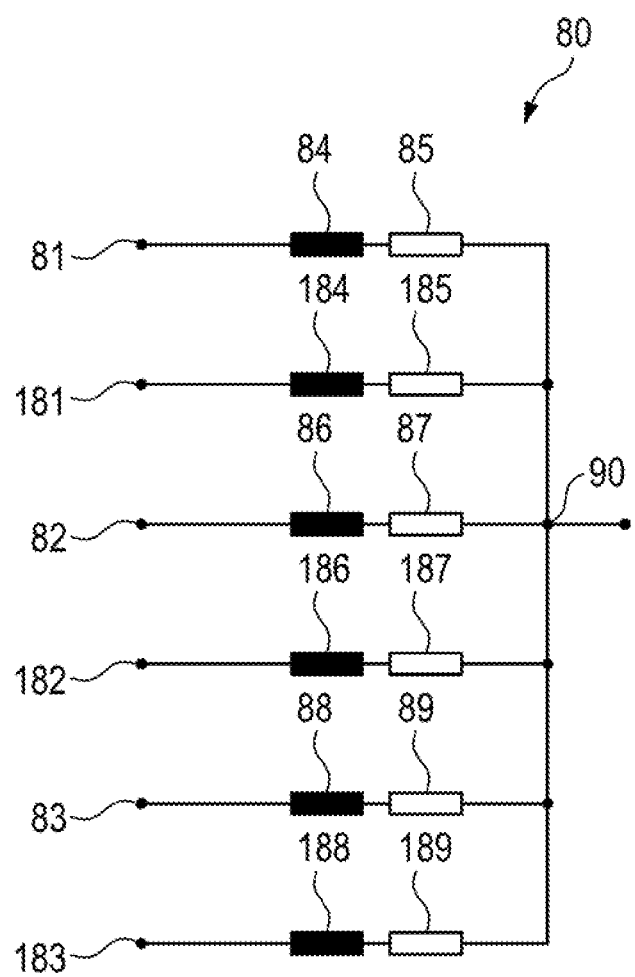

Further details and advantageous developments of the invention are evident from the exemplary embodiments which are described below and are illustrated in the drawings, which exemplary embodiments should in no way be understood as a restriction of the invention, and also from the dependent claims. In the figures:

FIG. 1 shows a first exemplary embodiment of a set-up of an electric drive and an inverter, FIG. 2 shows a second exemplary embodiment comprising an electric drive and an inverter, FIG. 3 shows voltages and currents in the inverter and in the winding arrangement in a schematic diagram, FIG. 4 shows currents in a three-phase winding arrangement in a schematic diagram, FIG. 5 shows, in a schematic illustration, currents in a three-phase winding arrangement with implementation of a reversal of the direction of rotation of the generated magnetic field, FIG. 6 shows, in a schematic illustration, currents in a three-phase winding arrangement with implementation of a reversal of the direction of rotation of the generated magnetic field, FIG. 7 shows, in a schematic illustration, currents in a three-phase winding arrangement with identical phase shifts, FIG. 8 shows, in a schematic illustration, currents in a three-phase winding arrangement, wherein the direction of rotation is changed, FIG. 9 shows, in a schematic illustration, the currents in the output stage with a six-phase winding arrangement, and FIG. 10 shows, in a schematic illustration, a winding arrangement having six windings and a star point.

DETAILED DESCRIPTION OF THE INVENTION

FIG. 1 shows a device 10 comprising a battery 12, an inverter 30, a winding arrangement 80, a rotor 93 and a control device 20 for driving the inverter 30. Such a device 10 can be used e.g. for a drive of an electric vehicle. The inverter 30, which can also be referred to as output stage, has a first inverter terminal 31, a second inverter terminal 32 and three bridge branches 61, 62, 63, which bridge branches 61, 62, 63 each comprise a first semiconductor switch 41, 42, 43, a winding terminal 81, 82, 83 and a second semiconductor switch 51, 52, 53. The first semiconductor switch 41, 42, 43 is provided between the first inverter terminal 31 and the assigned winding terminal 81, 82, 83, and the second semiconductor switch 51, 52, 53 is provided between the winding terminal 81, 82, 83 and the second inverter terminal 32.

The semiconductor switches used can be insulated gate bipolar transistors (IGBT), for example, which are favorable, but can be driven only at comparatively low switching frequencies. Moreover, they allow the current to flow only in one direction. It is advantageous to use field effect transistors (FET), in particular silicon carbide field effect transistors (SiC-FET), which enable very high frequencies.

In the exemplary embodiment, freewheeling diodes 46, 47, 48, 56, 57, 58 are connected in parallel with the first semiconductor switches 41, 42, 43 and with the second semiconductor switches 51, 52, 53, and said diodes enable a current flow counter to the normal current flow direction of the assigned semiconductor switch and protect the latter against an overvoltage.

The winding terminals 81, 82, 83 are connected to the winding arrangement 80 and can also be referred to as phase terminals.

The winding arrangement 80 has a plurality of windings 84, 86, 88, and in the illustration; a resistor 85, 87, 89 is assigned to each winding 84, 86, 88, said resistor symbolizing the electrical resistance of the winding wire. The winding terminal 81 is connected to a star point 90 via the winding 84 and the resistor 85. The winding terminal 82 is connected to the star point 90 via the winding 86 and the resistor 87. The winding terminal 83 is connected to the star point 90 via the winding 88 and the resistor 89. The winding arrangement 80 is thus interconnected in a star connection.

The battery 12 is a rechargeable battery, and it is connected to the first inverter terminal 31 and the second inverter terminal 32. A first charging terminal 91 is electrically connected to the star point 90 and a second charging terminal 92 is electrically connected to the second inverter terminal 32.

In the exemplary embodiment, by way of example, a charging socket 105 having two terminals is provided, and each of the two terminals of the charging socket 105 is preferably assigned a fuse 101 or 103, respectively, and a charging contactor 102 or 104, respectively, in order to enable a controlled disconnection of the charging socket 105 from the battery 12. The charging socket 105 is usually fitted on the vehicle.

A voltage source 100 is provided, e.g. a charging column for an electric vehicle or a DC charger connected to a domestic electrical terminal. The voltage source 100 can also be embodied as a current source, and, in the case of present-day DC charging columns, a voltage limit and/or a current limit is usually predefined by the vehicle, and if appropriate regularly updated.

Functioning

For a drive of the rotor 93, the control device 20 can electronically commutate the inverter 30 in a known manner and thereby generate a magnetic rotating field that drives the rotor 93. This can be referred to as a second operating state Z2.

The rotor 93 can be a permanent-magnetic rotor for synchronous machine, but it can also be the rotor of an asynchronous machine, for example a rotor having a short-circuited cage for a squirrel-cage rotor. A rotor with winding is also possible, for example for a separately excited asynchronous or synchronous machine.

The rechargeable battery 12 can be charged directly via the first inverter terminal 31 and the second inverter terminal 32 if the voltage of the voltage source 100 is at least of the same magnitude as the rated voltage of the rechargeable battery 12. It has been found, however, that rechargeable batteries 12 having a high rated voltage of e.g. 800 V or 600 V are advantageous since lower currents are required for the same power and the power loss decreases as a result. Moreover, if necessary, a very high power can be used. Further advantages, modes of behavior and boundary conditions are described in C. Jung (2017), Power Up with 800-V Systems: The benefits of upgrading voltage power for battery-electric passenger vehicles, IEEE Electrification Magazine, 5(1):53-58, doi: 10.1109/MELE.2016.2644560.

However, if the voltage source 100, which is preferably a DC voltage source, supplies a voltage that is lower than the rated voltage of such a battery 12, the battery 12 cannot be charged directly. It is possible to increase the voltage of the voltage source 100 by means of a step-up converter. Such step-up converters are also referred to as boost converters.

The inverter 30 and the winding arrangement 80 can be used as a boost converter via the charging terminals 91, 92, wherein the voltage source 100 is connected thereto for charging purposes. This is explained below with reference to FIG. 1 and FIG. 3, and the state can be referred to as a first operating state Z1.

FIG. 3 shows a schematic diagram illustrating the voltage U21 at the control line 21, the current I84 in the winding 84, the current I51 in the semiconductor switch 51 and the current I46 in the diode 46.

By means of the voltage U21 at the line 21, the control device 20 switches the semiconductor switch 51 alternately on (first bridge branch state BA1) and off (second bridge branch state BA2). In the present case, the semiconductor switch 51 is in the on state if the signal U21 is HIGH, but there are also semiconductor switches which are in the on state for LOW.

If the semiconductor switch 51 is switched on (first bridge branch state BA1), e.g. between t1 and t2 or between t3 and t4, a current flows from the voltage source 100 via the star point 90, the resistor 85, the winding 84, the winding terminal 81 and the semiconductor switch 51 via the second charging terminal 92 back to the voltage source 100. As a result, the current I84 in the winding 84 rises, and said current also flows through the semiconductor switch 51. This state of the bridge branch 61 is referred to as a first bridge branch state BA1. The first semiconductor switch 41, 42, 43 assigned to the respective bridge branch is preferably driven in the off state in the first bridge branch state BA1.

At the points in time t2, t4 and t6, the semiconductor switch 51 is switched off by means of the signal U21. Therefore, current I51 no longer flows via the semiconductor switch 51. The winding 84 endeavors to maintain the current I84 through the inductance of the winding 84, and a current therefore flows from the second inverter terminal 32 via the voltage source 100, via the resistor 85 of the winding, via the inductance of the winding 84 and via the diode 46 to the first inverter terminal 31 and thereby increases the voltage U between the first inverter terminal 31 and the second inverter terminal 32. The voltage thus rises above the voltage of the voltage source 100 and can be used for charging the rechargeable battery 12. The state of the bridge branch 61 is referred to as a second bridge branch state BA2. In the exemplary embodiment, the first semiconductor switch 41 remains in the off state in the first bridge branch state BA1 and in the second bridge branch state BA2, and the current flows via the freewheeling diode 46 in the second bridge branch state BA2. However, it is likewise possible, in the second bridge branch state BA2, to switch on the semiconductor switch 41 given a suitable choice of the associated component (for example FET), such that the current can flow directly via the first semiconductor switch 41. In this case, only a very low current will flow via the freewheeling diode. At very low charging powers, it is also possible, if appropriate, to dispense with the freewheeling diodes.

On the basis of the current diagram with the signal I84, it is thus possible to read off directly whether the control circuit 20 operates the respective bridge branch in the first bridge branch state BA1 or in the second bridge branch state BA2.

The basic principle has been described on the basis of the bridge branch 61. However, it is equally possible to carry out in parallel or successively an increase in the voltage U between the first inverter terminal 31 and the second inverter terminal 32 via the other bridge branches 62 and 63. The currents flowing via the diodes 46, 47, 48 add up and, as a result, the battery 12 can be charged more rapidly by the use of a plurality of bridge branches 61, 62, 63. For this purpose, the control device 20 outputs a control signal (U21, U22, U23, U24, U25, U26) to the inverter 30 via the lines 21, 22, 23, 24, 25, 26.

FIG. 4 shows by way of example the current I84 through the winding 84, the current I86 through the winding 86 and the current I88 through the winding 88 as a result of a corresponding driving of the semiconductor switches 51, 52, 53 by the control device 20, wherein a change is made between the first bridge branch state BA1 (current rises) and the second bridge branch state BA2 (current falls). The semiconductor switches 51, 52, 53 are driven in each case by means of periodic signals. In the present exemplary embodiment, the corresponding semiconductor switch 51, 52, 53 is switched on (BA1) for 50% of the period and it is switched off (BA2) for 50% of the period. Depending on the rated voltage of the battery 12 and the voltage of the voltage source 100, however, some other ratio may also be required or desired.

In the exemplary embodiment, the phase shift between the adjacent signals I84 and I86 is approximately 40°, and the phase shift between the adjacent signals I86 and I88 is likewise approximately 40°. Addition of the currents results in a ripple at the first inverter terminal 31, but said ripple is lower than in the case of driving without a phase shift, that is to say when a change is made into the second bridge branch state BA2 simultaneously in all the bridge branches 61, 62, 63.

The use of the phase shift gives rise to a rotating field via the three-phase winding arrangement 80, and depending on the application it is undesirable for the rotor 93 to be set in motion or to generate a high torque. This can lead for example to wear in the region of a transmission. In the present exemplary embodiment, the phase shift between the adjacent signals is not equal to 120°, and a rotating field which rotates uniformly and which leads to a drive of the permanent-magnetic rotor 93 therefore does not arise.

In the exemplary embodiment, there are sometimes two bridge branches in the first bridge branch state BA1, sometimes three bridge branches, sometimes one bridge branch and sometimes no bridge branch. The transition into the second bridge branch state BA2 thus takes place at different points in time.

It has proved to be advantageous to drive the semiconductor switches 51, 52, 53 with a control signal via the lines 21, 23, 25, which drive signal is in each case at a frequency of at least 5 kHz, more preferably at least 10 kHz, more preferably at least 50 kHz, more preferably at least 100 kHz, and particularly preferably at least 150 kHz. For the higher frequencies it is advantageous for at least one semiconductor switch to be embodied as a silicon carbide semiconductor switch or as a gallium nitride semiconductor switch. As a result of the high frequencies, firstly, a lower ripple of the currents flowing to the inverter terminals 31, 32 can be achieved and, secondly, the permanent-magnetic rotor 93 may not be able to follow such high frequencies, and so an undesired rotation of the rotor 93 does not occur. Depending on the type of semiconductor, however, high thermal losses occur at high frequencies, which thermal losses may need to be limited by lowering the frequency.

In FIG. 4, the currents I84, I86, I88 proceed within a band illustrated in a manner defined by an upper line 111 and a lower line 112.

FIG. 5 shows, a variant of FIG. 4 in which, up to a point in time that is depicted by a line 113 and is close to t4, a phase shift is present between the currents I84, I86 and I88, which phase shift generates a rotating field in a first direction of rotation. In the time between the lines 113 and 114, the period of the signal fed via the line 21 for the semiconductor switch 51 is lengthened, and, as a result, the signal I84 lines up behind the signals I86 and I88. This brings about a reversal of the rotating field generated in the winding arrangement 80. That is advantageous since the rotor 93 as an inert mass, even if it follows the rotating field somewhat, cannot suddenly rotate in the opposite direction. One disadvantage of lengthening the period for driving the semiconductor switch 51 is that the signal I84 leaves the band between the lines 111 and 112, in which band the currents range in the case where this lengthening of the period is not effected.

In the control device 20, the change between the first bridge branch state BA1 and the second bridge branch state BA2 in the respective bridge branch is preferably effected with the aid of timers that are used for determining the respective times. Timer interrupts can also be used. In this regard, for each bridge branch in the event of a change of the bridge branch state it is possible to stipulate when the next change is intended to take place. The values can be stored in a table, for example.

FIG. 6 shows a further exemplary embodiment for the currents I84, I86 and I88 in the case of corresponding driving of the semiconductor switches 51, 52, 53 by the control device 20. Until the point in time 115, which is at t3, the currents I84, I86 and I88 are provided with a predefined phase shift with respect to one another. At the point in time 115, the current I88 is increased again by virtue of the semiconductor switch 53 being switched on again prematurely, that is to say the first bridge branch state being provided in the bridge branch 63. Preferably, the first bridge branch state is likewise ended prematurely, and, as a result, the signal I88 lines up in front of the signals I84 and I86. As a result, the direction of rotation of the rotating field is likewise reversed, and the signals at the lines 21, 23 and 25 can again be fed with the same period duration. This can also be referred to as phase failure. The described driving of the semiconductor switches 51, 52 and 53 advantageously has the effect that the currents I84, I86 and I88 range in the customary bandwidth of the currents.

FIG. 7 shows a further exemplary embodiment for the driving of the semiconductor switches 51, 52, 53 by the control device 20, or the currents I84, I86 and I88 that arise as a result of this driving. In contrast to FIG. 4, the currents I84 and I86, and I86 and I88, respectively have a phase shift of 120°. This produces a particularly smooth voltage U between the first inverter terminal 31 and the second inverter terminal 32, since the peaks and troughs of the current profile are distributed uniformly. This is positive at high frequencies. The rotating field that arises as a result of these currents in the winding arrangement 80 has a uniform profile, however, and can therefore lead to an undesired drive of the rotor 93 at low switching frequencies. The currents I84, I86 and I88 are in a band defined by the lines 111 and 112.

FIG. 8 shows a further exemplary embodiment, in which the direction of the rotating field generated by the currents I84, I86 and I88 is changed in the range between the lines 116 and 117, which is situated around the point in time t4. Since a respective phase shift of 120° is present between the currents I84, I86 and I88, at least two or else all three currents I84, I86 and I88 have to be shifted relative to one another. In the exemplary embodiment, the period duration of the signal fed to the semiconductor switch 52 by the control device 20 is lengthened between the point in time 116 and the point in time 117, and, as a result, in the exemplary embodiment, the current I86 falls lower and is subsequently also increased for longer. As a result, the phase of the current I86 is shifted by 120°. In addition, the period of the signal fed to the semiconductor switch 53 via the line 25 is shortened at the point in time t4, and, as a result, the phase angle of the current I88 is reduced by 120°. At the point in time 117 there is once again a phase difference of 120° between the currents I84, I86 and I88, but the direction of the rotating field generated by these currents has been reversed.

The changes in the phase difference shown in FIG. 8, FIG. 6 and FIG. 5 can be repeated e.g. at predefined regular or irregular points in time.

FIG. 10 shows one exemplary embodiment of a six-phase winding arrangement 80. The first winding terminal 81 is connected to the star point 90 via the winding 84 and the resistor 85. A winding terminal 181 is connected to the star point 90 via a winding 184 and a resistor 185. The winding terminal 82 is connected to the star point 90 via the winding 86 and the resistor 87. A winding terminal 182 is connected to the star point 90 via a winding 186 and a resistor 187. The winding terminal 83 is connected to the star point 90 via the winding 88 and the resistor 89. A winding terminal 183 is connected to the star point 90 via a winding 188 and a resistor 189. A respective bridge branch has to be assigned to the winding terminals 81, 181, 82, 182, 83 and 183.

FIG. 9 shows one exemplary embodiment for the driving of the output stage 30 having six bridge branches for the winding arrangement 80 from FIG. 10. The currents I84, I86, I88, I184, I186 and I188 are illustrated. The currents have a phase difference of 60° with respect to one another, and this produces a comparatively smooth profile of the voltage U between the first inverter terminal 31 and the second inverter terminal 32.

While a rotating field always arises in the case of a three-phase winding arrangement 80 in the event of driving of the inverter 30 with an identical period duration and with phase differences, in the case of a winding arrangement 80 having at least four windings and assigned bridge branches the order of the phase shifts can be chosen in such a way that a rotating field that proceeds continuously in a predefined direction of rotation is not generated. This can be achieved by choosing the phase shifts in such a way that the successive maxima of the currents produce a rotation of the rotating field in different directions.

FIG. 2 shows a further exemplary embodiment of the device 10. While in FIG. 1 the charging terminals 91, 92 are connected to the star point 90 and to the lower inverter terminal, in FIG. 2 the charging terminals 91, 92 are connected to the star point 90 and to the upper inverter terminal. In both figures, that inverter terminal which is connected to the second charging terminal 92 is referred to as the second inverter terminal 32, and the other inverter terminal is referred to as the first inverter terminal 31. The first inverter terminal 31 is connected to the positive pole of the battery 12 in FIG. 1, and to the negative pole in FIG. 2. The second inverter terminal 32 is connected to the negative pole of the battery 12 in FIG. 1, and to the positive pole in FIG. 2.

The semiconductor switches designated as semiconductor switches 41, 42, 43, 51, 52, 53 in FIG. 1 are designated as semiconductor switches 141, 142, 143, 151, 152 and 153 in FIG. 2. The diodes 46, 47, 48, 56, 57, 58 from FIG. 1 are designated as diodes 146, 147, 148, 156, 157, 158 in FIG. 2 and likewise serve as freewheeling diodes. While in FIG. 1 the semiconductor switches 51, 52, 53 are used for increasing the voltage, in FIG. 2 the semiconductor switches 141, 142, 143 are used for increasing the voltage.

The first bridge branch state BA1 is set at the bridge branch 61, for example, by virtue of the second semiconductor switch 141 being switched on. As a result, a current flows from the voltage source 100 via the charging socket 105, via the second inverter terminal 32, via the second semiconductor switch 141, via the winding terminal 81, via the winding 84, via the resistor 85 and via the star point 90 back to the voltage source 100. As a result, the current in the winding 84 rises, but in the opposite direction to FIG. 1.

Afterward, the second bridge branch state BA2 is set by virtue of the control device 20 switching off the second semiconductor switch 141 and optionally switching on the first semiconductor switch 151. Therefore, current no longer flows via the second semiconductor switch 141. The winding 84 endeavors to maintain the current through the winding 84, and a current therefore flows from the first inverter terminal 31 via the freewheeling diode 156 or—with the first semiconductor switch 151 switched on—via the first semiconductor switch 151, via the winding terminal 81, via the winding 84, via the resistor 85, via the star point 90 and via the voltage source 100 to the second inverter terminal 32 and thereby increases the voltage U between the second inverter terminal 32 and the first inverter terminal 31. The voltage thus rises above the voltage of the voltage source 100 and can be used for charging the rechargeable battery 12.

The control device 20 can easily be modified for the circuit from FIG. 2 by virtue of the signals at the lines 21, 22, at the lines 23, 24 and at the lines 25, 26 respectively being interchanged.

For the rest, the embodiment and the functioning correspond to those in the previous figures.

Diverse alterations and modifications are naturally possible within the scope of the present invention.

By way of example it is possible to use only portion of the bridge branches for increasing the voltage.

A link capacitor can be provided between the first inverter terminal and the second inverter terminal, although said link capacitor leads to additional structural space and weight.

What is claimed is:

1. An inverter device comprising:
   a first inverter terminal,
   a second inverter terminal,
   a plurality of bridge branches, which bridge branches each comprise a first semiconductor switch, a winding terminal and a second semiconductor switch, the first semiconductor switch provided between the first inverter terminal and the winding terminal, and the second semiconductor switch provided between the winding terminal and the second inverter terminal, the winding terminals of the plurality of bridge branches connected to a winding arrangement, and
   a control device configured to output a control signal which enables a first bridge branch state and a second bridge branch state, wherein the first bridge branch state is a state in which the second semiconductor switch assigned to the bridge branch is switched on, and wherein the second bridge branch state is a state in which the second semiconductor switch assigned to the bridge branch is switched off, and
   wherein in a first operating state of the inverter device, at least two of the plurality of bridge branches are simultaneously in the first bridge branch state, and in the first operating state of the inverter device, a change of said at least two bridge branches into the second bridge branch state is subsequently carried out at different points in time in order, upon the transition into the second bridge branch state, to enable a conversion of the energy in the winding arrangement into a current between the first inverter terminal and the winding terminal of the corresponding bridge branch,
   wherein the control device is further configured to output in the first operating state the control signal to periodically bring about a change back and forth between the first bridge branch state and the second bridge branch state with a same period duration,
   wherein a phase shift between the control signal for one of the plurality of bridge branches and the control signal for another one of the plurality of bridge branches is not equal to 120°, and wherein the control device is further configured to output in the first operating state the control signal to change the phase shift by lengthening or shortening a period of the control signal in the case of at least one bridge branch.

2. The inverter device as claimed in claim 1, wherein the control device is further configured to output in the first operating state the control signal to drive the at least two bridge branches with the phase shift.

3. The inverter device as claimed in claim 2, wherein the control device is further configured to output in the first operating state the control signal to change the phase shift between the individual bridge branches at predefined points in time.

4. The inverter device as claimed in claim 2, wherein the control device is further configured to output in the first operating state the control signal to bring about a change back and forth between the first bridge branch state and the second bridge branch state in each case periodically, wherein at least four bridge branches are driven with the phase shift which does not generate a rotating field that rotates exclusively in one direction.

5. The inverter device as claimed in claim 1, wherein the control device is further configured to output in the first operating state the control signal to periodically switch back and forth in the respective bridge branch at a frequency of at least 5 kHz.

6. The inverter device as claimed in claim 1, wherein the control device is further configured to output in the first operating state the control signal to periodically switch back and forth in the respective bridge branch at a frequency of at least 10 kHz.

7. The inverter device as claimed in claim 1, wherein the control device is further configured to output in the first operating state the control signal to periodically switch back and forth in the respective bridge branch at a frequency of at least 50 kHz.

8. The inverter device as claimed in claim 1, wherein the control device is further configured to output in the first operating state the control signal to periodically switch back and forth in the respective bridge branch at a frequency of at least 100 kHz.

9. The inverter device as claimed in claim 1, wherein the control device is further configured to output in the first operating state the control signal to periodically switch back and forth in the respective bridge branch at a frequency of at least 150 kHz.

10. The inverter device as claimed in claim 1, wherein the control device is further configured to drive the first semiconductor switches and the second semiconductor switches of the inverter in a second operating state such that a rotating field suitable for driving a permanent-magnetic rotor is generated via the winding arrangement.

11. The inverter device as claimed in claim 1, wherein the winding arrangement comprises a plurality of windings, the plurality of windings are connected to a common star point in a star connection, wherein each winding terminal is connected to the common star point via one of the windings of the winding arrangement.

12. The inverter device as claimed in claim 11, wherein a first charging terminal is electrically connected to the common star point, and wherein a second charging terminal is electrically connected to the second inverter terminal, in order to enable a connection to a voltage source via the first charging terminal and the second charging terminal.

13. The inverter device as claimed in claim 1, to which a rechargeable battery is assigned, which rechargeable battery is electrically connected to the first inverter terminal and the second inverter terminal.

14. The inverter device as claimed in claim 1, wherein the control device is configured to output the control signal to periodically bring about a change of the at least two of the plurality of bridge branches back and forth between the first bridge branch state and the second bridge branch state with a same period duration.

15. The inverter device as claimed in claim 1, wherein the control device is configured to output the control signal to periodically bring about a change of the at least two of the plurality of bridge branches back and forth between the first bridge branch state and the second bridge branch state such that at a first time each of the plurality of bridge branches are in the first bridge branch state and at a second time none of the plurality of bridge branches are in the first bridge branch state.

16. An inverter device comprising:
a first inverter terminal,
a second inverter terminal,
a plurality of bridge branches, which bridge branches each comprise a first semiconductor switch, a winding terminal and a second semiconductor switch, the first semiconductor switch provided between the first inverter terminal and the winding terminal, and the second semiconductor switch provided between the winding terminal and the second inverter terminal, the winding terminals of the plurality of bridge branches connected to a winding arrangement, and
a control device configured to output a control signal which enables a first bridge branch state and a second bridge branch state with at least two of the plurality of bridge branches in a first operating state, wherein, in the first bridge branch state, the second semiconductor switch assigned to the bridge branch is switched on, and
wherein, in the second bridge branch state, the second semiconductor switch assigned to the bridge branch is switched off, and wherein when at least two of the plurality of bridge branches are simultaneously in the first bridge branch state, a change of said at least two bridge branches into the second bridge branch state is subsequently carried out in order, upon the transition into the second bridge branch state, to enable a conversion of the energy in the winding arrangement into a current between the first inverter terminal and the winding terminal of the corresponding bridge branch,
wherein the control device is further configured to output in the first operating state the control signal to periodically bring about a change back and forth between the first bridge branch state and the second bridge branch state,
wherein the control device is further configured to output in the first operating state the control signal, to carry out the change back and forth between the first bridge branch state and the second bridge branch state with the same period duration,
wherein the control device is further configured to output in the first operating state the control signal to drive the at least two bridge branches with a phase shift, and
wherein the control device is further configured to output in the first operating state the control signal to periodically change back and forth between the first bridge branch state and the second bridge branch state, wherein the at least three bridge branches are driven with a phase shift which generates a rotating field in a first predefined direction of rotation, and wherein, at a predefined point in time, the phase shift between at least three bridge branches is changed in such a way that a rotating field is generated in a direction of rotation opposite to the first predefined direction of rotation, wherein a phase shift between the control signal for one of the plurality of bridge branches and the control signal for another one of the plurality of bridge branches is not equal to 120°, and wherein the control device is further configured to output in the first operating state the control signal to change the phase shift by lengthening or shortening a period of the control signal in the case of at least one bridge branch.

* * * * *